United States Patent Office 3,231,521
Patented Jan. 25, 1966

3,231,521
NEUTRON SHIELDING USING A COMPOSITION COMPRISING GRAPHITE, BORON CARBIDE AND CARBONIZED RESIDUE
Donald G. Sturges, Youngstown, and George L. Bartholomew, Niagara Falls, N.Y., assignors to The Carborundum Company, Niagara Falls, N.Y., a corporation of Delaware
No Drawing. Filed May 24, 1961, Ser. No. 112,224
3 Claims. (Cl. 252—478)

The present invention relates to refractory bodies and the manufacture thereof and also to the raw batch mixture employed in such manufacture.

The present invention is a continuation-in-part of application Serial No. 770,907 filed October 31, 1958, now U.S. Patent No. 3,153,636 and entitled "Porous Bodies of Controlled Densities and Methods of Making Them."

Various refractory bodies have been proposed and used as nuclear shielding materials. Materials suitable for nuclear shielding are quite difficult to produce because of the various seemingly incompatible properties required. For example, the barns rating or thermal neutron capture cross section should be substantially uniform and, at the same time, the material should have good thermal insulating characteristics, reasonable structural strength, ease of fabrication or machinability, and simplicity of manufacture. In order to be satisfactory as a nuclear shielding material, it also should be capable of being formed into any suitable shape and should have substantial homogeneity throughout.

We have found that a relatively high density borated graphite made in accordance with the procedures set forth hereinafter is entirely satisfactory, not only as a nuclear shielding material, but also that the material is suitable for other applications in which refractoriness, good thermal insulating characteristics, structural strength and controlled density are of importance.

In accordance with our invention, a relatively high density borated graphite body can be prepared from a raw batch made by mixing high purity skeletal graphite, crushed graphitic solids or natural flake graphite with finely divided boron carbide and a carbonaceous organic binder. This mixture may be cold pressed in a steel or other suitable mold at pressures designed to give the desired density. This green body may then be subjected to a baking cycle for a sufficient period of time and at suitable temperatures to carbonize the binder. Where a product having a density in the range of 1.5 grams per cubic centimeter and 2.0 grams per cubic centimeter is desired, the pressure employed in the molding of the green body should be in the neighborhood of 10,000 pounds per square inch and the baking cycle should be carried out in a period of about 24 to 36 hours. The baking should be carried out in a reducing atmosphere and the temperature utilized should be in the neighborhood of 1000° F.

Various carbonaceous organic binders may be used in carrying out our invention. The thermosetting epoxy-modified phenolic resin sold by the Varcum Chemical Company, Niagara Falls, New York under the trademark "Varcum 1933" has been found satisfactory. Various other phenolic resins, epoxies and polyesters may be employed.

The examples set forth below will suffice to illustrate our invention.

*Example 1*

A suitable raw batch consists of the following:

|  | Percent |
|---|---|
| Graphite turnings | 83.5 |
| Boron carbide | 8.5 |
| Powdered phenolic resin No. 1364 | 8.0 |

To this mix, 1% Carbosota was added. The boron carbide was approximately 180 mesh and finer. The powdered phenolic resin was obtained from Varcum Chemical Company and is identified as No. 1364.

In preparing the mix, the graphite was first screened through a six mesh screen. It was then weighed and dumped in a mixer tub. The boron carbide was then weighed and dumped into the mixer tub and the two constituents mixed for a period of about two minutes. The Carbosota was then weighed and added and further mixing was carried out for a period of about five minutes. The resin was then weighed and mixed with the other ingredients for a period of about twenty minutes. The proper weight of mix to provide the desired density was then determined and poured into a mold which had been heated to 265° F. The mix was then pressed in the mold to a density of approximately 1.5 grams/cc. to 2.0 grams/cc. The mold was then opened and the pressed block was measured for size and shape. The block was then cured in a bell kiln. During baking or curing, it was buried in a mixture of 70% silicon carbide and 30% battery coke. The temperature was raised approximately 60° per hour to a temperature of about 600° C. and it was held at this temperature for a period of twelve hours. The body was then allowed to cool to room temperature. The bedding material was then cleaned from the blocks and it was cut to the desired shape. It was found that the borated graphite blocks made in accordance with the procedure just stated had the desired properties for use as thermal nuclear shields.

*Example 2*

Another mix formula which may be used is as follows:

|  | Percent |
|---|---|
| Graphite turnings | 90.0 |
| Boron carbide | 2.0 |
| Powdered phenolic resin No. 1364 | 8.0 |

To this mixture, approximately 1.0% Carbosota was added.

This mixture was prepared in the manner described above and the molding and curing operations described above were also carried out and it was found that the blocks so prepared had the necessary properties described above.

Carbosota is the registered trademark of the Barrett Division of Allied Chemical and Dye Corporation for a refined coal-tar creosote oil preservative.

*Example 3*

Entirely satisfactory products were made from mixes substantially the same as those set forth above, the mixes being cold pressed in a steel mold at approximately 10,000 pounds per square inch and then subjected to a baking cycle of 24 to 36 hours at temperatures on the order of 600° C.

Products made in accordance with the examples given above were entirely suitable as neutron shielding media for use in atomic reactors.

We have found that the barns rating or thermal neutron capture cross section may be altered within limits by increasing the boron carbide content or by the use of an enriched boron carbide.

Our invention, of course, may be practiced in various other ways within the scope of the appended claims.

We claim:

1. A method for protecting an environment against neutron radiation which comprises interposing between the source of said radiation and said environment, as a shielding material, a mass of borated graphite, said borated graphite consisting essentially of graphite, finely divided boron carbide, and the carbonized residue of a carbonaceous organic binder.

2. The method as defined in claim 1 in which the shielding material is a mass of high density borated graphite consisting essentially of finely divided particles of boron carbide, skeletal graphite, and the carbonized residue of a carbonaceous organic binder.

3. The method as defined in claim 1 in which said shielding material has a density of from about 1.5 to 2.0 grams per cubic centimeter.

References Cited by the Examiner

UNITED STATES PATENTS 2,331,479  10/1943  Krellner.
2,961,415  11/1960  Axelrad _____ 176—88 X
2,988,522  6/1961  Smith et al. _____ 252—478

FOREIGN PATENTS 797,692  7/1958  Great Britain.

OTHER REFERENCES

Mantell: Industrial Carbon, 1946, page 226, TP 245. C4M3.

CARL D. QUARFORTH, *Primary Examiner.*